(12) United States Patent
Hasegawa et al.

(10) Patent No.: US 7,919,165 B2
(45) Date of Patent: Apr. 5, 2011

(54) WET-TYPE FRICTION MATERIAL AND ITS MANUFACTURING METHOD

(75) Inventors: Masato Hasegawa, Ama-gun (JP); Hiroki Okamura, Nagoya (JP)

(73) Assignee: Aisin Kako Kabushiki Kaisha, Toyota-Shi, Aichi-Ken (JP)

( * ) Notice: Subject to any disclaimer, the term of this patent is extended or adjusted under 35 U.S.C. 154(b) by 156 days.

(21) Appl. No.: 11/905,617

(22) Filed: Oct. 2, 2007

(65) Prior Publication Data

US 2008/0199641 A1    Aug. 21, 2008

(30) Foreign Application Priority Data

Oct. 3, 2006  (JP) ................ 2006-272076
Aug. 22, 2007  (JP) ................ 2007-215478

(51) Int. Cl.
*B32B 3/00* (2006.01)
*B32B 7/00* (2006.01)
*C09K 3/14* (2006.01)
*F16D 13/00* (2006.01)

(52) U.S. Cl. ... 428/66.2; 106/36; 192/70.11; 192/70.14; 360/98.08; 428/64.1; 428/66.6

(58) Field of Classification Search ............... 428/66.2, 428/64.1, 66.6; 192/70.14, 70.11; 360/98.08; 106/36

See application file for complete search history.

(56) References Cited

U.S. PATENT DOCUMENTS

| | | | | |
|---|---|---|---|---|
| 5,647,466 A | * | 7/1997 | Umezawa | 192/70.14 |
| 6,132,877 A | * | 10/2000 | Winckler et al. | 428/408 |
| 6,456,455 B2 | * | 9/2002 | McCutcheon et al. | 360/98.08 |
| 2003/0079653 A1 | * | 5/2003 | Okamura et al. | 106/36 |
| 2004/0050646 A1 | * | 3/2004 | Matthes et al. | 192/107 R |

FOREIGN PATENT DOCUMENTS

| | | |
|---|---|---|
| JP | 58-189232 A | 11/1983 |
| JP | S62-106562 U | 7/1987 |
| JP | S64-11444 U | 1/1989 |
| JP | H02-116059 U | 9/1990 |
| JP | 6-37909 B2 | 5/1994 |
| JP | 07-071559 A | 3/1995 |
| JP | 11-193841 A | 7/1999 |
| JP | 11-230305 A | 8/1999 |
| JP | 2003-130106 A | 5/2003 |
| JP | 2003-231043 A | 8/2003 |
| JP | 2004-11710 A | 1/2004 |
| JP | 2004-278609 A | 10/2004 |

OTHER PUBLICATIONS translation of JP 2004-278609 (IKEGUCHI), Oct. 7, 2004 (See Applicant's IDS filed May 27, 2010.).*
Japanese Office Action dated Aug. 24, 2010 issued in the corresponding Japanese Patent Application No. 2007-215478.

* cited by examiner

*Primary Examiner* — Brent T O'Hern
(74) *Attorney, Agent, or Firm* — Buchanan Ingersoll & Rooney PC (57) ABSTRACT

In a wet-type friction material, a ring-shaped friction material substrate is compressed and fixed on a surface of a core metal by heat-pressing by a manufacturing metal mold. At the same time, a taper of an angle α corresponding to a taper at an outer peripheral side of an upper mold is provided on an outer peripheral side of the ring-shaped friction material substrate. Thus, the taper is formed such that a thickness in a radial direction of the ring-shaped friction material substrate becomes smaller from a middle point toward an outer peripheral edge.

8 Claims, 5 Drawing Sheets

WET-TYPE FRICTION MATERIAL AND ITS MANUFACTURING METHOD

BACKGROUND OF THE INVENTION

1. Field of the Invention

This invention relates to a wet-type friction material and its manufacturing method that is able to stabilize an initial frictional property of the wet-type friction material without using a polishing device or a cutting device, thereby shortening a manufacturing time to a large extent, while preventing unnecessary polishing dusts or cutting dusts from being generated.

2. Description of the Related Art

Commonly used wet-type friction material for an automatic transmission is composed of a core metal of a flat ring plate shape and a friction material substrate. The friction material substrate is made of a ring-shaped friction material substrate sheet (may be referred to as "ring sheet" hereafter) or a plurality of segmented friction material sheets (may be referred to as "segment pieces" hereafter). Either of the ring sheet and the segment pieces is cut out from a friction material substrate as a base material sheet. Then, the ring sheet is adhered to one surface of the core metal or two ring sheets are adhered to both surface of the core metal. Alternatively, a group of the segment pieces is adhered to one surface of the core metal in a ring arrangement or two groups of the segment pieces are adhered to both surfaces of the core metal. Each of these wet-type friction material has a rotating lining surface (surface of frictional material substrate) pressed to a disc or the like to transmit a rotational force. Therefore, it is necessary that a frictional coefficient of the lining surface is stable. In view of that, as shown in a first patent publication (Japanese Patent Publication No. H6-37900), an initial smoothing is operated on a newly produced wet-type friction material in a manufacturing process in order to make the frictional coefficient constant.

However, the initial smoothing operation of the wet-type friction material is conducted, while the wet-type friction material and a disc being assembled in a device similar to an actual device as a final product. Consequently, it takes much time to obtain a target frictional coefficient and leads to an increase of manufacturing steps and a delay in a production time. As a result, it has been impossible conventionally to attain a reduction in manufacturing costs. In view of that, a second patent publication (Japanese Laid Open Patent Publication No. H11-193841) discloses an improved ring-shaped friction material as a wet-type friction material. In the friction material, a friction surface is made of an abraded surface that is polished by a polishing surface composed of a flat surface and a plurality of grooves shaped on the flat surface.

It is described in the second patent publication that, in case of the wet-type friction material, the friction surface is abraded by the polishing surface composed of the flat surface and the plural grooves made on the flat surface, so that unnecessary polishing is prevented and a rapid initial smoothing operation is possible, thereby shortening the manufacturing time. A third patent publication (Japanese Laid Open Patent Publication No. 2003-231043) discloses another wet-type friction material. It is described in the third patent publication that the wet-type friction material is capable of obtaining a stable frictional property from the beginning of use by cutting or shaving a front surface of a friction material used as a lock-up clutch.

However, in the techniques described in the second and third patent publications, an abrading step or a cutting step is also necessary in the manufacturing process, though it is shorter than the initial smoothing operation. Moreover, another problem is caused that there is produced unnecessary grinding sludge or cutting chips in these grinding step or cutting step.

In view of that, a fourth patent publication (Japanese Laid Open Patent Publication No. 2004-11710) discloses an improved wet-type frictional facing. In wet-type frictional facing has a ring shape and is provided at an outer peripheral side of a piston of a lock-up clutch. The wet-type fictional facing has a thickness reduced from an outer peripheral side to an inner peripheral side in a radial direction thereof or has a tapered surface. Moreover, a density at the outer peripheral side in the radial direction of the wet-type frictional facing is made smaller than the other part. Alternatively, a tapered surface is formed at an outer peripheral side in a radial direction of a fixing surface of the piston on which a wet-type frictional facing is secured so as to be inclined along a frictional surface to which the wet-type frictional facing is faced. An outer peripheral part in a radial direction of the wet-type frictional facing is a tapered surface corresponding to the fixing surface. It is described in the fourth patent publication that, with the above features, μ-V characteristics of the lock-up clutch is improved so as to restrain judder generation at the time of slip control.

However, in the technique described in the fourth patent publication, a strength at the inner peripheral side in the radial direction of the wet-type frictional facing becomes too high, in case a taper is given such that the density at the outer peripheral side in the radial direction of the wet-type frictional facing becomes smaller than the other part. Consequently, it becomes difficult to make an entire surface of the wet-type frictional facing closely contact with the facing frictional surface, even if a pressure rises at the side of the facing frictional surface to which the wet-type frictional facing is oppositely located. Moreover, in case a taper is provided at the outer peripheral side in the radial direction of the fixing surface, there is a problem that the piston as a whole must be manufactured separately from normal pistons.

BRIEF SUMMARY OF THE INVENTION

An object of the present invention is to provide a wet-type friction material and its manufacturing method that is able to make an initial frictional property of the wet-type friction material stable without conducting an initial smoothing operation or a polishing work or a cutting work, thereby preventing unnecessary polishing dusts or cutting dusts from being generated, while enabling a core metal of a normal core metal of a flat ring shape to be used as it is, and that enables reduction in a number of manufacturing steps and shortening of a manufacturing time to a large extent.

According to a first aspect of the invention, there is provided a wet-type friction material required to be closely contacted with an outer peripheral part of a frictional surface of a counterpart member having a fixed inclination. The wet-type friction material comprises a core metal of a flat ring shape and a friction material substrate adhered and fixed to at least one surface of the core metal. The friction material substrate consists of a ring-shaped friction material substrate or a plurality of segmented friction material substrates. Each of the ring-shaped friction material substrate and the segmented friction substrate is cut out of a friction material substrate. The friction material substrate has a thickness decreasing part that decreases a thickness linearly in a radial direction of the friction material substrate along an entire length of the friction material substrate or from a middle point to an outer peripheral edge of the friction material substrate so that the friction material substrate decreases the thickness in accordance with the inclination of the frictional surface of the counterpart member.

According to a second aspect of the invention, there is provided a wet-type friction material required to be closely contacted with an outer peripheral part of a frictional surface of a counterpart member having a fixed inclination. The wet-type friction material comprises a core metal of a flat ring shape and a friction material substrate adhered and fixed to at least one surface of the core metal. The friction material substrate consists of a ring-shaped friction material substrate or a plurality of segmented friction material substrates. Each of the ring-shaped friction material substrate and the segmented friction substrate is cut out of a friction material substrate. The friction material substrate has a thickness decreasing part that decreases a thickness curvilinearly in a radial direction of the friction material substrate from a middle point to an outer peripheral edge of the friction material substrate so that the friction material substrate decreases the thickness in accordance with the inclination of the frictional surface of the counterpart member.

In the wet-type friction material, the friction material substrate may preferably have a constant thickness part at the other part than the thickness decreasing part, the constant thickness part having a constant thickness in the radial direction of the friction material substrate.

In the wet-type friction material, the friction material substrate may preferably further have a laser carbonized surficial part from a surface to a depth within a range between 1 µm to 15 µm, the laser carbonized surficial part being carbonized by heating by a laser beam irradiated on a resin and fibers existing in a superficial part of the friction material substrate.

In the wet-type friction material, the thickness decreasing part may preferably be a heat-pressed part that is compressed and deformed by a heat-press, while controlling a maximum decrease of the thickness at the outer peripheral edge of the friction material substrate to not more than 5/100 of a largest thickness of the friction material substrate.

According to a third aspect of the invention, there is provided a manufacturing method of a wet-type friction material required to be closely contacted with an outer peripheral part of a frictional surface of a counterpart member having a fixed inclination. The wet-type friction material comprises a core metal of a flat ring shape and a friction material substrate adhered and fixed to at least one surface of the core metal. The friction material substrate consists of a ring-shaped friction material substrate or a plurality of segmented friction material substrates. Each of the ring-shaped friction material substrate and the segmented friction substrate is cut out of a friction material substrate. The manufacturing method comprises a heat-press step for heat-pressing the friction material substrate at the same time when the friction material substrate is adhered and fixed on the core metal. The heat-press step is conducted by a metal mold having an inclined molding surface in a radial direction thereof corresponding to the inclination of the frictional surface of the counterpart member. The metal mold heat-presses and deforms the friction material substrate into a linear tapered shape with a thickness decreasing part that decreases a thickness linearly in a radial direction of the friction material substrate along an entire length of the friction material substrate or from a middle point to an outer peripheral edge of the friction material substrate so that the friction material substrate decreases the thickness in accordance with the inclination of the frictional surface of the counterpart member.

According to a third aspect of the invention, there is provided a manufacturing method of a wet-type friction material required to be closely contacted with an outer peripheral part of a frictional surface of a counterpart member having a fixed inclination. The wet-type friction material comprises a core metal of a flat ring shape and a friction material substrate adhered and fixed to at least one surface of the core metal. The friction material substrate consists of a ring-shaped friction material substrate or a plurality of segmented friction material substrates. Each of the ring-shaped friction material substrate and the segmented friction substrate is cut out of a friction material substrate. The manufacturing method comprises a heat-press step for heat-pressing the friction material substrate at the same time when the friction material substrate is adhered and fixed on the core metal. The heat-press step is conducted by a metal mold having a curved molding surface in a radial direction thereof corresponding to the inclination of the frictional surface of the counterpart member. The metal mold heat-presses and deforms the friction material substrate into a curvilinear tapered shape with a thickness decreasing part that decreases a thickness curvilinearly in a radial direction of the friction material substrate from a middle point to an outer peripheral edge of the friction material substrate so that the friction material substrate decreases the thickness in accordance with the inclination of the frictional surface of the counterpart member.

In the manufacturing method of the wet-type friction material, the heat-press step may preferably be conducted such that the metal mold heat-presses and deforms the friction material substrate into the linear shape, while making a constant thickness part at the other part than the thickness decreasing part, the constant thickness part having a constant thickness in the radial direction of the friction material substrate.

In the manufacturing method of the wet-type friction material may preferably further comprise a laser carbonizing step for irradiating a laser beam on a resin and fibers existing in a superficial part of the friction material substrate so as to heat and carbonize the superficial part of the friction material substrate from a surface to a depth within a range between 1 µm to 15 µm thereof.

In the manufacturing method of the wet-type friction material, it is preferable that the metal mold has an inclination of the inclined molding surface at an angle equal to an angle of the inclination of the frictional surface of the counterpart member, and, in the heat-press step, the metal mold compress and deform the thickness decreasing part while controlling a maximum decrease of the thickness at the outer peripheral edge of the friction material substrate to not more than 5/100 of a largest thickness of the friction material substrate.

According to the first aspect of the invention, a taper is formed on a surface of the friction material substrate. A size of the taper is nearly equal to that of a frictional surface of a counterpart member such as a disc with which the wet-type friction material is engaged.

A conventional flat friction material substrate cannot provide a smooth engagement, since only a corner part of an outer peripheral end surface thereof is contacted first with the counterpart member. In contrast, in the wet-type friction material according to the invention, the taper is provided on the surface of the friction material substrate such as a ring-shaped friction material substrate or a plurality of segment pieces so as to nearly conform to the frictional surface of the counterpart member. Therefore, an entire surface of the taper portion is contacted with the surface of the counterpart member from the beginning, thereby providing a very smooth engagement.

Thus, since the entire surface of the taper portion is contacted with the surface of the counterpart member from the beginning, a stable initial friction coefficient can be obtained.

As a result, the wet-type friction material is able to make an initial frictional property of the wet-type friction material stable without conducting an initial smoothing operation or a polishing work or a cutting work, thereby preventing unnecessary polishing dusts or cutting dusts from being generated, while enabling a core metal of a normal core metal of a flat ring shape to be used as it is. Moreover, if the wet-type friction material is produced by the manufacturing method of a third aspect of the invention, it enables reduces a number of manufacturing steps and shortens a manufacturing time to a large extent.

According to the second aspect of the invention, a curved shape is formed at an outer peripheral side of a surface of the friction material substrate. A size of the curved shape is nearly equal to that of a frictional surface of a counterpart member such as a disc with which the wet-type friction material is engaged.

A conventional flat friction material substrate cannot provide a smooth engagement, since only a corner part of an outer peripheral end surface thereof is contacted first with the counterpart member. In contrast, in the wet-type friction material according to the invention, the curved shape is provided on the surface of the friction material substrate such as a ring-shaped friction material substrate or a plurality of segment pieces so as to nearly conform to the frictional surface of the counterpart member. Therefore, an entire surface of the curved shape or curved portion is contacted with the surface of the counterpart member from the beginning, thereby providing a very smooth engagement.

Thus, since the entire surface of the curved portion is contacted with the surface of the counterpart member from the beginning, a stable initial friction coefficient can be obtained. Moreover, it is possible to carry out a step for giving the curved shape on the surface of the friction material substrate such as the ring-shaped friction material substrate or the plurality of the segment pieces simultaneously with a step for compressing and securing the friction material substrate on the surface of the core metal. Therefore, there is no special step needed. In addition, since a size of the taper is very small (not more than $5/100$ at an outermost peripheral edge at a largest), a density of the friction material substrate is never changed. Therefore, a normal type of the core metal of the flat ring shape can be used. Furthermore, it is possible to eliminate a conventional initial smoothing operation or abrading work or cutting work, so that the manufacturing steps can be reduced and the manufacturing time can be shortened very much.

As a result, the wet-type friction material is able to make an initial frictional property of the wet-type friction material stable without conducting an initial smoothing operation or a polishing work or a cutting work, thereby preventing unnecessary polishing dusts or cutting dusts from being generated, while enabling a core metal of a normal core metal of a flat ring shape to be used as it is, and that enables reduction in a number of manufacturing steps and shortening of a manufacturing time to a large extent.

If the thickness of the other part than the taper portion is constant, it is not necessary to apply an excessive pressure in the step for giving the taper shape or the curved shape on the surface of the friction material substrate such as the ring-type friction material substrate or the segment pieces. Therefore, a life of a manufacturing metal mold becomes long and an energy source can be saved.

If the superficial part of the friction material substrate is laser-carbonized by the above fixed thickness, the following effects are obtained. Specifically, the laser beam has a stable light intensity and a fine adjustment of the light intensity is easy. Therefore, the laser beam can evenly carbonize a desired thickness of a resin and fibers existing at the superficial part of the ring-shaped friction material substrate or the segment pieces. Then, it is possible to give advantageous effects that the $\mu$-V gradient property is improved by carbonizing the superficial part. If the thickness of the carbonized portion is less than 1 $\mu$m in from the surface, the effect to improve the $\mu$-V gradient property is scarcely obtained. To the contrary, if the thickness of the carbonized portion exceeds 15 $\mu$m from the surface, the carbonized layer at the superficial part is peeled off.

According to the third aspect of the invention, it is possible to produce the wet-type friction material of the first aspect of the invention. Moreover, it is possible to carry out a step for giving the taper on the surface of the friction material substrate such as the ring-shaped friction material substrate or the plurality of the segment pieces simultaneously with a step for compressing and securing the friction material substrate on the surface of the core metal. Therefore, there is no special step needed. In addition, since a size of the taper is very small (not more than $5/100$ at an outermost peripheral edge at a largest), a density of the friction material substrate is never changed. Therefore, a normal type of the core metal of the flat ring shape can be used. Furthermore, it is possible to eliminate a conventional initial smoothing operation or abrading work or cutting work, so that the manufacturing steps can be reduced and the manufacturing time can be shortened very much.

As a result, the manufacturing method is able to reduce a number of manufacturing steps and shorten a manufacturing time to a large extent.

According to the fourth aspect of the invention, it is possible to produce the wet-type friction material of the second aspect of the invention. Moreover, it is possible to carry out a step for giving the taper on the surface of the friction material substrate such as the ring-shaped friction material substrate or the plurality of the segment pieces simultaneously with a step for compressing and securing the friction material substrate on the surface of the core metal. Therefore, there is no special step needed. In addition, since a size of the taper is very small (not more than $5/100$ at an outermost peripheral edge at a largest), a density of the friction material substrate is never changed. Therefore, a normal type of the core metal of the flat ring shape can be used. Furthermore, it is possible to eliminate a conventional initial smoothing operation or abrading work or cutting work, so that the manufacturing steps can be reduced and the manufacturing time can be shortened very much.

As a result, the manufacturing method is able to reduce a number of manufacturing steps and shorten a manufacturing time to a large extent.

Further objects and advantages of the invention will be apparent from the following description, reference being had to the accompanying drawings, wherein preferred embodiments of the invention are clearly shown.

BRIEF DESCRIPTION OF THE SEVERAL VIEWS OF THE DRAWINGS

FIG. 7 are graphs showing variations of taper widths and heights, while FIG. 7 (a) showing variations or rates of change of the taper width "x" of the ring-shaped friction material substrate of the wet-type friction material machined by a conventional cutting technique, FIG. 7 (b) showing variations or rates of change of the taper width "x" of the ring-shaped friction material substrate according to the manufacturing method of the wet-type friction material of the embodiments of the invention, FIG. 7 (c) showing variations or rates of change of the taper height "y" of the ring-shaped friction material substrate of the wet-type friction material according to the conventional manufacturing method, FIG. 7 (d) showing variations or rates of change of the taper height "y" of the ring-shaped friction material substrate according to the manufacturing method of the wet-type friction material of the embodiments of the invention.

DETAILED DESCRIPTION OF THE INVENTION

Several embodiments of the invention are described hereunder referring to FIG. 1 to FIG. 7. The same reference character is used to show the same element throughout the several embodiments.

Figure 1:
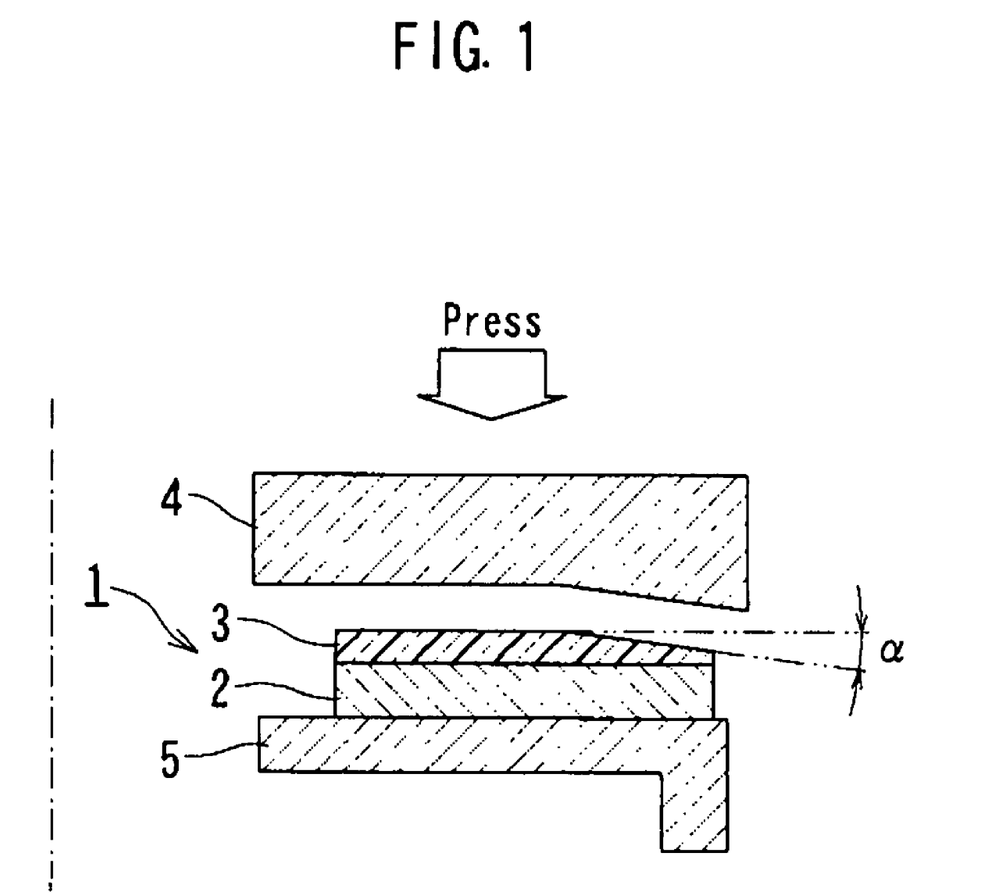
FIG. 1 is a cross-sectional view showing a schematic overall structure of a wet-type friction material and its manufacturing device according to a first embodiment.

FIG. 1 is a cross-sectional view showing a schematic overall structure of a wet-type friction material and its manufacturing device according to a first embodiment.

As shown in the cross-sectional view of FIG. 1, a wet-type friction material 1 according to the first embodiment is a ring-shaped wet-type friction material 1. The ring-shaped wet-type friction material 1 has a core metal 2 of a flat ring plate shape and a ring-shaped friction material substrate 3 adhered and fixed on a surface of the core metal 2. The ring-shaped friction material substrate 3 is cut out of a friction material substrate in a shape of a strip sheet or the like as a raw material. The raw material strip sheet has a same or even thickness as a whole, and a blank of the friction material substrate 3 before processing has a fixed and constant thickness as a whole, though FIG. 1 shows a state of the friction material substrate 3 after the processing and the substrate 3 has an uneven thickness part.

A one-dot chain line in FIG. 1 shows a rotating center axis of the ring-shaped wet-type friction material 1 as well as a rotating center axis of a manufacturing metal mold or a press mold 4 and 5 of the ring-shaped wet-type friction material 1. In a manufacturing process or method of the first embodiment of the ring-shaped wet-type friction material 1, the ring-shaped friction material substrate 3 is placed on the surface of the core metal 2 on which an adhesive is coated. Then, the ring-shaped friction material substrate 3 is pressed and secured on the core metal 2 by use of the manufacturing metal mold 4 and 5. This securing step itself is similar to those steps of a conventional manufacturing method and its detailed description is omitted.

In contrast, in the first embodiment of manufacturing method of the wet-type friction material 1, an upper mold 4 of the manufacturing metal mold has an outer peripheral side reversely tapered as a new characteristic feature. That is, the upper mold 4 has a molding surface or press surface composed of a flat molding surface located at an inner peripheral side and an inclined molding surface located at an outer peripheral side. The inclined molding surface or press surface is linearly inclined downward to an outer peripheral edge from nearly a middle position (or from a position a little nearer to the outer peripheral edge) in a radial direction of the upper mold 4. The lower mold 5 is similar to a conventional one. An inclination of the inclined molding surface of the upper mold 4 is set as the same angle as an angle of an inclination of a frictional surface of a counterpart member to which the friction material 1 is opposed and engaged. A typical counterpart member may be a disc used in an automatic transmission or the like for a vehicle use. Since common discs as the counterpart member has an inclination angle of about 0.3 degree, the inclination angle of the inclined molding surface of the upper mold 4 may preferably be set at such 0.3 degree in a common use.

Moreover, in the first embodiment of the manufacturing method, the friction material substrate 3 set on the core metal 2 is held and pressed between the upper mold 4 and the lower mold 5 of the manufacturing metal mold. At this time, a high surface pressure of 20 kgf/cm2 to 30 kgf/cm2 is applied to the friction material substrate 3, while heating it at a temperature of 220° C. to 230° C. This step is a heat-press step and is also a new characteristic feature of the manufacturing method. After the heat-press step, the ring-shaped friction material 3 is compressed and fixed on the surface of the core metal 2. At the same time, a taper of an angle α is provided on an outer peripheral side of the ring-shaped friction material 3 so as to correspond to the taper or inclination at the outer peripheral side of the upper mold 4 as shown in FIG. 1.

After the heat-press step, the friction material substrate 3 on the core metal 2 is formed with a constant thickness part at an inner peripheral side in its radial direction and a tapered thickness part at an outer peripheral side thereof, corresponding to the shapes of the flat molding surface and the inclined molding surface of the upper mold 4. Since the inclination angle of the inclined molding surface of the upper mold 4 is normally set at 0.3 degree, the taper angle α is about 0.3 degree in the first embodiment of the wet-type friction material 1 and very small. That is, the tapered thickness part of the friction material substrate 3 has an inclined friction surface of an angle of 0.3 degree, while the constant thickness part having a flat friction surface. However, in each figures including FIG. 1 in the attached drawings, the taper angle is shown larger and emphasized for easy understanding. The flat and inclined surfaces of the friction material substrate 3 are engaged with the frictional surface of the counterpart member. In the heat-press step, a compression margin or a thickness to be decreased by the heat-compression and deformation is preferably controlled to be not more than 5/100 (5%) of a total thickness or a largest thickness of the friction material substrate 3. That is, after compression, an outer end thickness of the inclined surface or the thickness at the outer peripheral edge of the friction material substrate 3 becomes smaller than the thickness of the flat thickness part by not more than about 5/100 (5%). In other words, the thickness at the outer peripheral edge of the friction material substrate 3 becomes 95/100 (95%) or more of the thickness of the flat thickness part.

As described above, the tapered part is formed on the ring-shaped friction material substrate 3 without adding any new step in the first embodiment of the manufacturing step. That is, the tapered part is formed by linearly changing the thickness in the radial direction of the friction material substrate 3 from a middle point to an outer peripheral direction at the same time of the heat-press step in which the friction material substrate 3 is compressed and fixed on the surface of the core metal 2. Thus, the first embodiment of the manufacturing method enables the wet-type friction material 1 to be manufactured in shorter time or shortens the production time to a large extent, in comparison with conventional manufacturing steps conducting the initial smoothing operation, the abrading work or the cutting work.

As shown in FIG. 1, the ring-shaped friction material substrate 3 has the tapered portion formed so as to be thinner or make the thickness smaller toward the outward direction from an intermediate position in the radial direction. Therefore, the friction material substrate 3 starts being smoothly engaged with the frictional surface of the counterpart member not by a line but by a plane from the outer peripheral side where a torque is high when the ring-shaped wet-type friction material 1 is engaged with a disc. Thus, it is possible to stabilize the initial frictional coefficient.

Figure 5:
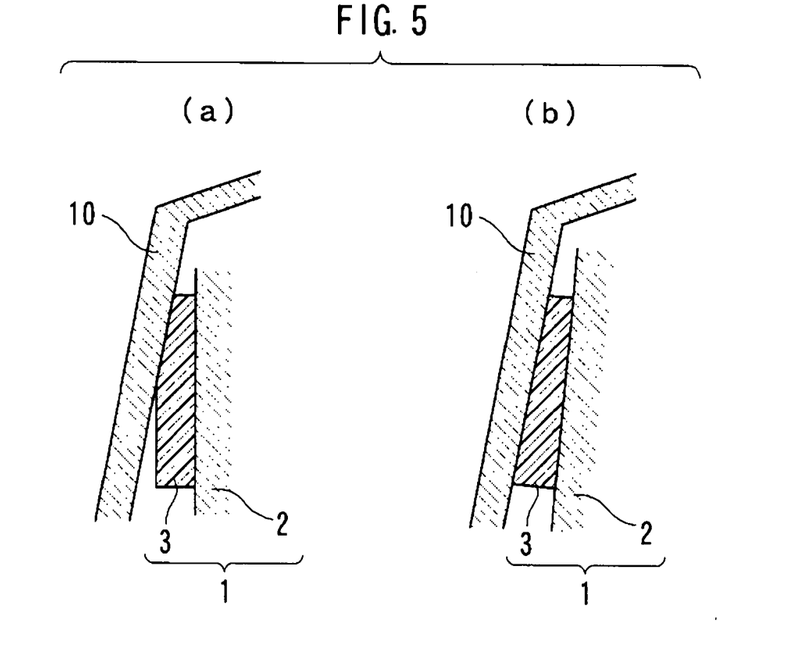
FIG. 5 illustrates a operation of the first embodiment of the wet-type friction material, while FIG. 5 (a) showing a partial sectional view of the wet-type friction material according to the first embodiment of the invention that is in a contacted state with a opposing or counterpart member, and FIG. 5 (b) showing a partial sectional view of the wet-type friction material according to the first embodiment of the invention that is applied with a largest pressure to the counterpart member.

Particularly, the wet-type friction material 1 is contacted with a frictional surface of a counterpart member such as the disc housed in an automatic transmission device or the like in operation. At this time, the wet-type friction material 1 should make the friction material substrate 3 closely contacted with an outer peripheral part of the frictional surface of the counterpart member from the beginning. Moreover, the counterpart member or the frictional surface has a fixed inclination as shown in FIG. 5, thereby forming a tapered surface or inclined surface thereon.

In this case, a conventional flat friction material substrate indispensably has only an outer peripheral edge linearly contacted with the inclined frictional surface of the counterpart member at the start of operation. In contrast, the friction material substrate 3 of the first embodiment inherently is able to make the entire outer peripheral part in planar contact with the outer peripheral part, in the radial direction, of the inclined frictional surface of the counterpart member from the start of operation. Thus, as described above, the initial friction coefficient is improved very much. As a result, the first embodiment of the wet-type friction material 1 is applicable in a very desirable manner to any counterpart members wherein it is required to be closely contacted with an outer peripheral part of a frictional surface of a counterpart member having a fixed inclination.

It is necessary to change a degree of the tapering depending on a shape of the counterpart member for engagement. Then, several modes of ring-shaped friction material substrates having different tapering shapes are described hereafter as wet-type friction materials according to the first to a fourth embodiments of the invention referring to FIG. 2*a* to FIG. 2*d*.

Figure 2A:
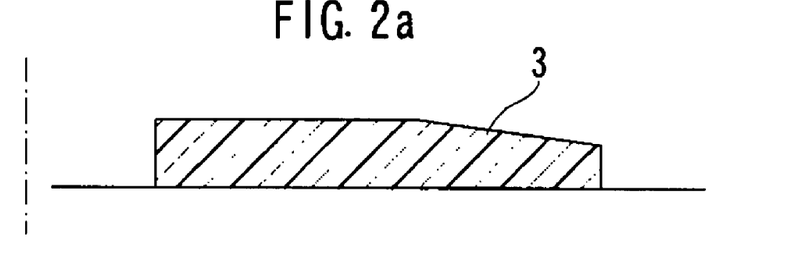
FIG. 2a is a cross-sectional view showing a sectional shape of a ring-shaped friction material substrate of the wet-type friction material according to the first embodiment of the invention.

FIG. 2*a* is a cross-sectional view showing a sectional shape of the ring-shaped friction material substrate of the wet-type friction material according to the first embodiment of the invention.

FIG. 2*a* illustrates a cross-sectional shape of the ring-shaped friction material substrate 3 according to the first embodiment, while being enlarged a little compared with FIG. 1. As described above, the friction material substrate 3 linearly changes the thickness in the radial direction from the middle position thereof toward the outer peripheral edge so as to form the tapered portion having the linearly inclined friction surface thereon. Then, the wet-type friction material substrate exhibits the above-mentioned advantageous effects. The friction material substrate 3 is designed for a counterpart member in which its frictional surface has an inclined surface at an outer peripheral part in a radial direction thereof, as described above. Accordingly, the friction material substrate 3 has the tapered portion or a thickness decreasing part that decreases the thickness linearly in the radial direction of the friction material substrate 3 from the middle point to the outer peripheral edge of the friction material substrate 3 so that the friction material substrate 3 decreases the thickness in accordance with the inclination of the frictional surface of the counterpart member. The taper angle α of the inclination of the tapered part may be 0.3 degree as mentioned above.

Figure 2B:
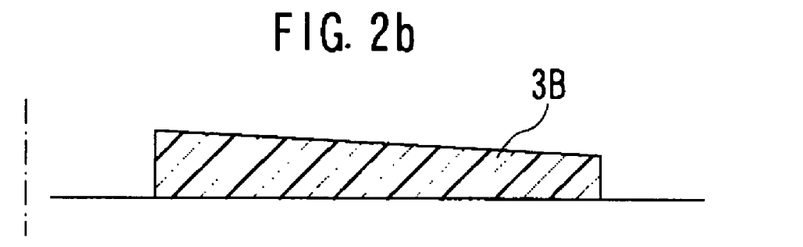
FIG. 2b is a cross-sectional view showing a sectional shape of a ring-shaped friction material substrate of a wet-type friction material according to a second embodiment of the invention.

FIG. 2*b* is a cross-sectional view showing a sectional shape of a ring-shaped friction material substrate of a wet-type friction material according to a second embodiment of the invention.

FIG. 2*b* illustrates a cross-sectional shape of a ring-shaped friction material substrate 3B according to the second embodiment. The friction material substrate 3B linearly changes a thickness in a radial direction from an inner peripheral edge to an outer peripheral edge along a full length thereof so as to form a tapered portion having a linearly inclined friction surface thereon. The tapered portion (i.e. entire friction material substrate 3B) is an outwardly tapered portion. An area of the tapered portion or a length of the inclined surface in the friction material substrate 3B becomes longer than the friction material substrate 3 of the first embodiment if their lengths of the substrates 3, 3B are the same. The friction material substrate 3B is cut out of the same raw material as the first embodiment of the friction material substrate 3. The friction material substrate 3B is designed for a counterpart member in which its frictional surface has an outwardly inclined surface over its entire length in a radial direction thereof or an inclined frictional surface is formed along its full length at a slight angle (e.g. less than 0.3 degree). Accordingly, the friction material substrate 3B has the tapered portion or a thickness decreasing part that decreases the thickness linearly in the radial direction of the friction material substrate 3B along the entire length of the friction material substrate 3B so that the friction material substrate 3B decreases the thickness in accordance with the inclination of the frictional surface of the counterpart member. The taper angle (corresponding to α of FIG. 1) of the tapered part may be less than that of the first embodiment, since the length of the inclined surface of the friction material substrate 3B becomes inherently larger than that of the friction material substrate 3. The second embodiment of the friction material substrate 3B is fixed on the core metal 2 in the same way to define a wet-type friction material that act similarly and performs similar advantageous effects to the first embodiment.

Figure 2C:
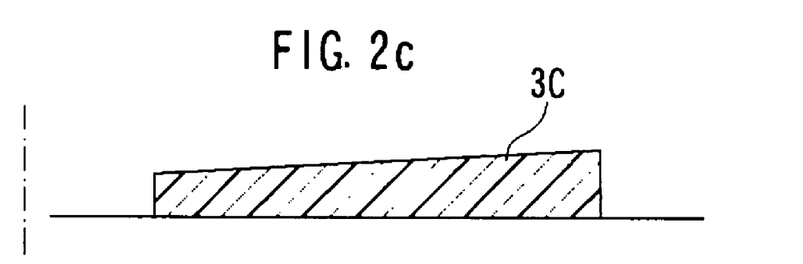
FIG. 2c is a cross-sectional view showing a sectional shape of a ring-shaped friction material substrate of a wet-type friction material according to a third embodiment of the invention.

FIG. 2c is a cross-sectional view showing a sectional shape of a ring-shaped friction material substrate of a wet-type friction material according to a third embodiment of the invention.

FIG. 2c illustrates a cross-sectional shape of a ring-shaped friction material substrate 3C according to the third embodiment. The third embodiment of the friction material substrate 3C has such a line-symmetric shape to the second embodiment of the friction material substrate 3B. Specifically, the friction material substrate 3C linearly changes a thickness in a radial direction from an outer peripheral edge to an inner peripheral edge along a full length thereof so as to form a tapered portion having a linearly inclined friction surface thereon. The tapered portion (i.e. entire friction material substrate 3C) is an outwardly tapered portion in contrast with the friction material substrate 3B. The friction material substrate 3C is cut out of the same raw material as the first embodiment of the friction material substrate 3. The friction material substrate 3C is designed for a counterpart member in which its frictional surface has an inwardly inclined surface over its entire length in a radial direction thereof or an inclined frictional surface is formed along its full length at a slight angle (e.g. less than 0.3 degree). Accordingly, the friction material substrate 3C has the tapered portion or a thickness decreasing part that decreases the thickness linearly in the radial direction of the friction material substrate 3C along the entire length of the friction material substrate 3C so that the friction material substrate 3C decreases the thickness in accordance with the inclination of the frictional surface of the counterpart member. The taper angle (corresponding to α of FIG. 1) of the tapered part may be less than that of the first embodiment, too, as in the second embodiment. The third embodiment of the friction material substrate 3C is fixed on the core metal 2 in the same way to define a wet-type friction material that act similarly and performs similar advantageous effects to the second embodiment.

Figure 2D:
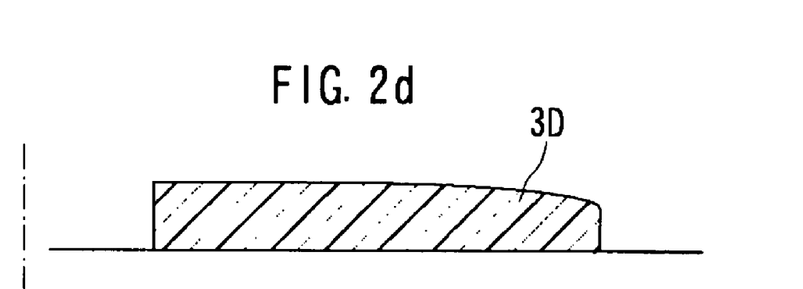
FIG. 2d is a cross-sectional view showing a sectional shape of a ring-shaped friction material substrate of a wet-type friction material according to a fourth embodiment of the invention.

FIG. 2d is a cross-sectional view showing a sectional shape of a ring-shaped friction material substrate of a wet-type friction material according to a fourth embodiment of the invention.

FIG. 2d illustrates a cross-sectional shape of a ring-shaped friction material substrate 3D according to the fourth embodiment. The friction material substrate 3D curvilinearly changes a thickness in a radial direction from a middle point to an outer peripheral edge in a radial direction thereof so as to form a tapered portion having a curvilinearly inclined friction surface thereon. The tapered portion of the friction material substrate 3D is an outwardly curvilinearly tapered portion. An area of the tapered portion or a length of the inclined surface in the friction material substrate 3D may be nearly the same as that of the friction material substrate 3 of the first embodiment if their lengths of the substrates 3, 3D are the same. The friction material substrate 3D is cut out of the same raw material as the first embodiment of the friction material substrate 3. The friction material substrate 3D is designed for the same counterpart member as that of the first embodiment of the friction material substrate 3. Still, the friction material substrate 3D is of course applicable to a counterpart member in which its frictional surface has an outwardly curvilinearly inclined surface from a middle position in a radial direction thereof or a curvilinearly inclined frictional surface is formed from an intermediate location at a predetermined curvature. In this case, the radius of curvature of the inclined surface of the friction material substrate 3D corresponds to or is equal to the radius of curvature of the inclined frictional surface of the counterpart member. At any rate, the friction material substrate 3D has the tapered portion or a thickness decreasing part that decreases the thickness curvilinearly in the radial direction of the friction material substrate 3D along the entire length of the friction material substrate 3D so that the friction material substrate 3D decreases the thickness in accordance with the inclination of the frictional surface of the counterpart member. A curvature (corresponding to the taper angle α of FIG. 1) of the inclined surface of the tapered part corresponds to or is nearly equal to the taper angle of the first embodiment if seen in broad perspective, as long as the inclined part starts from the same point as the friction material substrate 3. The fourth embodiment of the friction material substrate 3D is fixed on the core metal 2 in the same way to define a wet-type friction material that act similarly and performs similar advantageous effects to the first embodiment.

Except the ring-shaped friction material substrate 3C according to the third embodiment having the tapered part having a linearly increasing thickness from the inner peripheral side to the outer peripheral side, each of the substrates 3, 3B and 3D makes its thickness smaller linearly or curvilinearly from the inner peripheral side to the outer peripheral side at an inclined angle (protruded angle) α. Therefore, each of the friction material substrates 3, 3B and 3D is smoothly engaged with a disc as the commonly used counter part member having the frictional surface inclined from the inner peripheral side to the outer peripheral side at an inclined angle (protruded angle) α. The counter part member can be deemed to be protruded to a flat (non-inclined) surface of a conventional friction material substrate due to the inclined frictional surface.

On the other hand, in the third embodiment of the ring-shaped friction material substrate 3C forming the tapered part making the thickness linearly larger from the inner peripheral side to the outer peripheral side, there are advantageous effects that it is smoothly engaged with a disc having a frictional surface inclined from an outer peripheral side to an inner peripheral side at an inclined angle (protruded angle) α.

As a first experiment, there were prepared three examples of ring-shaped wet-type friction materials according to the invention as well as one ring-shaped wet-type friction material as a comparative example. The first example of the friction material had the ring-shaped friction material substrate 3 according to the first embodiment adhered thereto. The second example of the friction material had the ring-shaped friction material substrate 3B according to the second embodiment adhered thereto. The third example of the friction material had the ring-shaped friction material substrate 3D according to the fourth embodiment adhered thereto. On the other hand, the comparative example of the friction material had the conventional flat ring-shaped friction material substrate adhered thereto. Then, each of the friction materials was pressed to a disc as a counterpart member at a pressure of 200 kPa and a change of a frictional coefficient μ was measured in each case while increasing a rotation speed. Such test was repeated ten times in succession. The test results are shown in FIG. 3.

Figure 3:
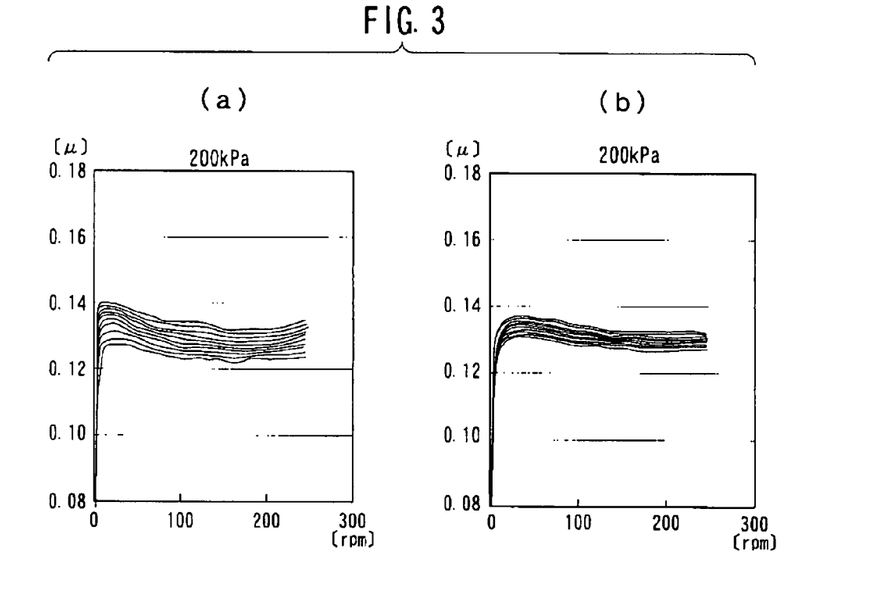
FIG. 3 are graphs both showing initial frictional properties, while FIG. 3 (a) showing an initial frictional property of a conventional wet-type friction material that has a ring-shaped friction material substrate of an even thickness, and FIG. 3 (b) showing an initial frictional property of the embodiments of the wet-type friction material of the invention.

FIG. 3 are graphs both showing initial frictional properties, while FIG. 3 (a) showing an initial frictional property of a conventional wet-type friction material that has a ring-shaped friction material substrate of an even thickness, and FIG. 3 (b) showing an initial frictional property of the embodiments of the wet-type friction material of the invention.

FIG. 3(a) shows measurement results on the comparative example of the ring-shaped wet-type friction material adhered with the conventional flat ring-shaped friction material substrate. FIG. 3(b) shows measurement results on the first example of the ring-shaped wet-type friction material adhered with the first embodiment of the ring-shaped friction material substrate. In preparing the first example, a laser beam was irradiated on a surface of the first embodiment of the friction material substrate 3 so as to heat the surface of the friction material substrate 3 beforehand for the purpose of improving compatibility with the disc or the like as the counterpart member. Of course, in each of the above embodiments, it is preferable that the friction material substrate 3, 3B, 3C ,3D further has a laser carbonized surficial part from a surface to a depth within a range between 1 µm to 15 µm. In this case, the laser carbonized surficial part is carbonized by heating by a laser beam irradiated on a resin and fibers existing in a superficial part of the friction material substrate 3, 3B, 3C, 3D.

In the first example of the friction material substrate, a resin and fibers existing at a superficial part of the ring-shaped friction material substrate 3 is heated by the leaser beam irradiation. Then, the superficial part is carbonized within a range of a first carbonized thickness, in which it is carbonized from the surface to a depth of 1 µm, and a second carbonized thickness, in which it is carbonized from the surface to a depth of 15 µm. That is, the surficial carbonized of the friction material substrate is within a range of 1 µm to 15 µm in thickness. At this time, the laser beam has a stable light intensity and fine control of the light intensity is easy. Therefore, it is possible to evenly carbonize the resin and the fibers existing at the superficial part of the ring-shaped friction material substrate 3 by a desired thickness.

As shown in FIG. 3(a), the frictional coefficient µ varies to a large degree within the frictional rotation operation repeated ten times in case of the comparative example of the flat ring-shaped ring-type friction material substrate. In contrast, as shown in FIG. 3 (b), a variation or degree of change of the frictional coefficient µ becomes smaller in case of the first example in which the laser beam is irradiated on the surface of the first embodiment of the ring-shaped friction material substrate 3.

Figure 4:
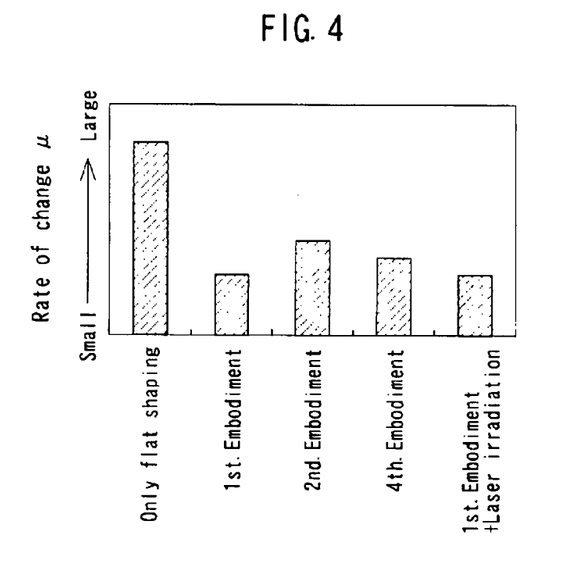
FIG. 4 is a bar graph showing variations or rates of change of an initial frictional coefficient of the wet-type friction material according to the embodiments of the invention, while comparing them with a variation or rate of change of an initial frictional coefficient of the conventional wet-type friction material that has a ring-shaped friction material substrate of an even thickness.

Measurement results of a rate of change of the frictional coefficient p under a condition of a rotation of 50 rpm is shown in FIG. 4. FIG. 4 is a bar graph showing variations or rates of change of an initial frictional coefficient of the wet-type friction material according to the embodiments of the invention, while comparing them with a variation or rate of change of an initial frictional coefficient of the conventional wet-type friction material that has a ring-shaped friction material substrate of an even thickness.

As shown in FIG. 4, each of the ring-shaped friction material substrate 3, 3B, 3D according to the first, second and fourth embodiments has a rate of change of the frictional coefficient µ much smaller than that of the conventional flat ring-shaped friction material substrate. Therefore, it is clear that the inventive friction material substrate has a very stable initial frictional coefficient.

Described referring to FIG. 5 is a reason why the initial frictional coefficient is stable in case of the ring-shaped wet-type friction material adhered with the ring-shaped friction material substrate according to the present embodiment. FIG. 5 illustrates a operation of the first embodiment of the wet-type friction material, while FIG. 5 (a) showing a partial sectional view of the wet-type friction material according to the first embodiment of the invention that is in a contacted state with a opposing or counterpart member, and FIG. 5 (b) showing a partial sectional view of the wet-type friction material according to the first embodiment of the invention that is applied with a largest pressure to the counterpart member.

As shown in FIG. 5 (a), the ring-shaped wet-type friction material 1 according to the first embodiment is pressed to a disc 10 as a counterpart member at a low pressure at a beginning of an operation. At this time, the disc 10 is linearly protruded or inclined from an inner peripheral side toward an outer peripheral side, though an inclination angle α is actually very small (inclined or protruded angle α=0.3 degree). Therefore, the conventional flat ring-shaped friction material substrate has only an outer peripheral corner part contacted with the disc 10. Consequently, it is impossible to obtain a smooth engagement.

In contrast, in the ring-shaped wet-type friction material 1 according to the first embodiment, the thickness in the radial direction of the ring-shaped friction material substrate 3 is set to be the tapered angle α (α=0.3 degree) from the middle point thereof. Therefore, as shown in FIG. 5 (a), a right side surface of the disc 10 is evenly contacted with a surface at the outer peripheral side (inclined friction surface) of the friction material substrate 3. As a result, a smooth engagement is obtained. Then, as a suppress pressure becomes larger gradually, the ring-shaped friction material substrate 3 having flexibility changes into such a shape as conforming to the right side surface of the disc 10. Thereby, the entire surface of the ring-shaped friction material substrate 3 is engaged with the right side surface of the disc 10, thereby transmitting a rotational force efficiently.

Figure 6:
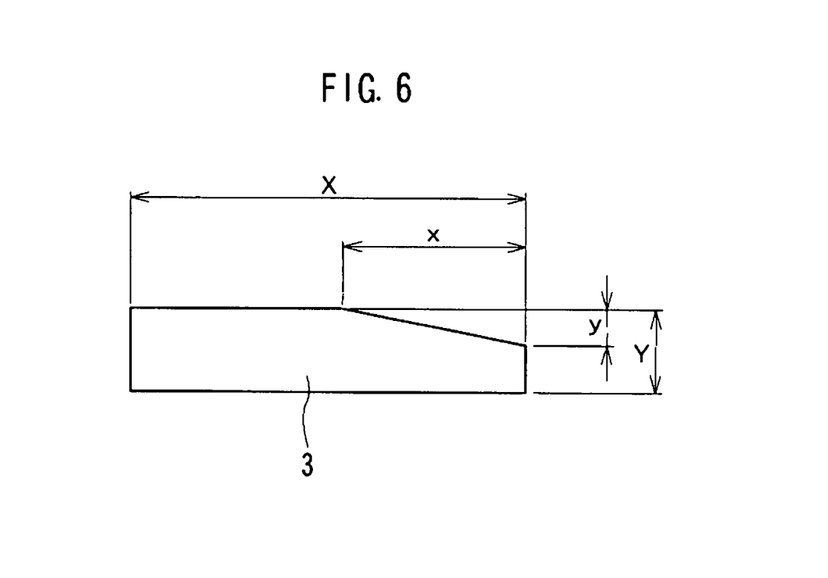
FIG. 6 is a schematic view showing a relation between a taper width "x" and a taper height "y" of the ring-shaped friction material substrate of the wet-type friction material according to the first embodiment of the invention.

Next described referring to FIG. 6 is a design standard of the ring-shaped friction material substrate 3 used in the ring-shaped wet-type friction material 1 according to the first embodiment. FIG. 6 is a schematic view showing a relation between a taper width "x" and a taper height "y" of the ring-shaped friction material substrate of the wet-type friction material according to the first embodiment of the invention. As the design standard, an aimed dimension of the shape is set taking into account a mechanism at the time of engagement and a density distribution of the ring-shaped friction material substrate 3. As shown in FIG. 6, it is supposed that a length in the radial direction of the ring-shaped friction material substrate 3 is X and a largest thickness is Y Then, the upper mold 4 of the manufacturing metal mold is designed such that a taper width "x" becomes 28% to 50% of the radial direction length X and a taper height or taper thickness "y" becomes not more than 5% of the largest thickness Y.

This is because, if the taper height "y" exceeds 5% of the largest thickness Y, the ring-shaped friction material substrate 3 is so much compressed that the density becomes too high. On the other hand, the taper width "x" is set to the taper height "y" such that it conforms to an inclination angle of a counterpart member with which the ring-shaped wet-type friction material 1 is engaged. As a result, the taper width "x" becomes inherently within a range of 28% to 50% of the radial direction length X.

Figure 7:
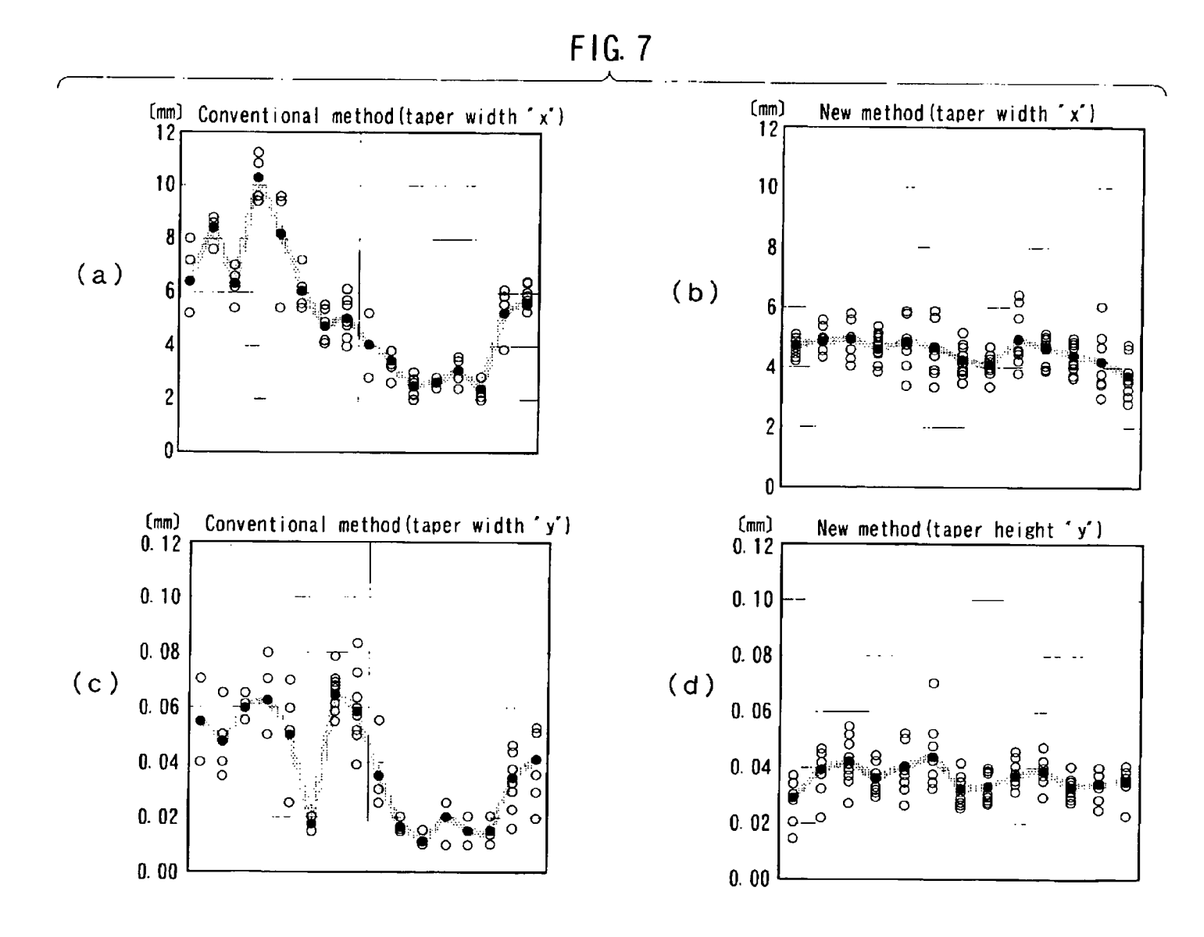

Next described referring to FIG. 7 is an accuracy in taper machining of the ring-shaped friction material substrate 3, while comparing a taper machining method by a cutting work as the conventional technique and the taper machining method by the heat-press according to the present embodiment. FIG. 7 are graphs showing variations of taper widths and heights, while FIG. 7 (a) showing variations or rates of change of the taper width "x" of the ring-shaped friction material substrate of the wet-type friction material machined by the conventional cutting technique, FIG. 7 (b) showing variations or rates of change of the taper width "x" of the ring-shaped friction material substrate according to the manufacturing method of the wet-type friction material of the embodiments of the invention, FIG. 7 (c) showing variations or rates of change of the taper height "y" of the ring-shaped friction material substrate of the wet-type friction material according to the conventional manufacturing method, FIG. 7 (d) showing variations or rates of change of the taper height "y" of the ring-shaped friction material substrate according to the manufacturing method of the wet-type friction material of the embodiments of the invention.

There were prepared an example of the ring-shaped friction material substrate according to the present embodiment and a comparative example of a ring-shaped friction material substrate having a similar tapered portion formed by the conventional cutting technique. Then, variations of the taper width "x" and the taper height "y" is measured, respectively, on the example and the comparative example. Then, as shown by left half parts of the graphs of FIG. 7 (a) and FIG. 7 (c), in the taper machining method by cutting as the conventional art, the friction material substrate is cut to a large amount on both the taper width "x" and the taper height "y" during a cutting tool is new, however, the variation is very large. Moreover, as shown by right hand parts of graphs of FIG. 7 (b) and FIG. 7 (d), the cutting of the friction material substrate is getting hard if the cutting tool gets worn, so that both the taper width "x" and the taper height "y" fall under the aimed dimension to a large extent.

In contrast, as shown in FIG. 7 (b) and FIG. 7(d), in the taper machining method by the heat-press according to the present embodiment, the variation is small on both the taper width "x" and the taper height "y" and the aimed dimension (taper width "x"=5 mm, taper height "y"=0.04 mm) is almost satisfied. In conclusion, in case of the cutting work using the conventional cutting technique, the cutting tool needs to be renewed frequently and, in addition, the accuracy of the obtained product is not stable. In contrast, in case of the manufacturing method of the wet-type friction material according to the present embodiment, the accuracy of the obtained product is stable and the manufacturing metal mold can be used semipermanently. Moreover, it is not necessary to add a new manufacturing step and a low cost manufacturing is possible.

As described above, the wet-type friction material and the manufacturing method according to the present embodiment is able to make an initial frictional property of the wet-type friction material stable without conducting an initial smoothing operation or a polishing work or a cutting work, thereby preventing unnecessary polishing dusts or cutting dusts from being generated, and enables reduction in a number of manufacturing steps and shortening of a manufacturing time to a large extent.

While the description of FIG. 3 to FIG. 7 takes the first embodiment of the invention as an example, the configuration and the function and effects described in the description of FIG. 3 to FIG. 7 is also applicable to the second to the fourth embodiments of the invention. Moreover, the above embodiment is described as the taper width "x" is 5 mm and the taper height "y" is 0.04 mm. However, it is a matter of course that the values of the taper width and the taper height are set appropriately depending on an inclination angle of a counterpart member with which the wet-type friction material 1 is engaged. In addition, in the above embodiment, the ring-shaped friction material substrate 3 is cut out of the friction material substrate sheet and adhered and fixed to one surface of the core metal 2 of the flat ring shape. However, similar functions and effects are obtained even in case the ring-shaped friction material substrates 3 are adhered and fixed to both the opposite surfaces of the core metal 2 of the flat ring shape.

Moreover, in the above embodiment, the ring-shaped wet-type friction material 1 is described in which the ring-shaped friction material substrate 3 is adhered and fixed to the core metal 2 of the flat ring shape. However, similar configuration or structure is applicable to a segment-type wet-type friction material in which a plurality of segment pieces cut out of the friction material substrate are adhered and fixed to the core metal 2 of the flat ring shape. In this case, similar functions and effects are obtained, too.

Furthermore, in the above embodiment, the ring-shaped friction material substrate 3 is compressed and secured on the surface of the core metal at the surface pressure of 20 kgf/cm2 to 30 kgf/cm2 and at the temperature of 220° C. do 230° C. However, the pressure and the heating temperature are optimally set depending on a composition and a thickness of the friction material substrate and a kind of an adhesive or the like.

The invention is not limited to the present embodiment in constructions, components, assembling parts, shapes, materials, sizes, numbers, connecting relations and so on of the other parts of the wet-type friction material. Moreover, the invention is not limited to the present embodiment in other steps of the manufacturing method of the wet-type friction material.

Each of the values indicated in the above embodiment does not show a threshold value but shows a preferred value that is suitable in practice. Therefore, the invention is of course practicable even if the above values are changed a little.

The preferred embodiments described herein are illustrative and not restrictive, the scope of the invention being indicated in the appended claims and all variations which come within the meaning of the claims are intended to be embraced therein.

The invention claimed is:
1. A wet-type friction material usable for a clutch required to be closely contacted with an outer peripheral part of a frictional surface of a counterpart member having a fixed inclination, comprising:
   a core metal of a flat ring shape; and
   a friction material substrate adhered and fixed to at least one surface of the core metal, the friction material substrate consisting of a ring-shaped friction material substrate or a plurality of segmented friction material substrates, each of the ring-shaped friction material substrate and the segmented friction substrate being cut out of a friction material substrate;
   wherein the friction material substrate has a thickness decreasing part and a constant thickness part, and the thickness decreasing part decreases a thickness linearly in a radial direction of the friction material substrate from a middle point to the outer peripheral edge of the friction material substrate so that the friction material substrate decreases the thickness in accordance with the inclination of the frictional surface of the counterpart member at the thickness decreasing part, and
   wherein the constant thickness part is provided at a part other than the thickness decreasing part, the constant thickness part has a constant thickness in the radial direction of the friction material substrate, and the constant thickness part is formed at an inner peripheral side in the radial direction of the friction material substrate, while the thickness decreasing part is formed at an outer peripheral side in the radial direction of the friction material substrate.

2. A wet-type friction material usable for a clutch required to be closely contacted with an outer peripheral part of a frictional surface of a counterpart member having a fixed inclination, comprising:

a core metal of a flat ring shape; and a friction material substrate adhered and fixed to at least one surface of the core metal, the friction material substrate consisting of a ring-shaped friction material substrate or a plurality of segmented friction material substrates, each of the ring-shaped friction material substrate and the segmented friction substrate being cut out of a friction material substrate;

wherein the friction material substrate has a thickness decreasing part and a constant thickness part, and the thickness decreasing part decreases a thickness curvilinearly in a radial direction of the friction material substrate from a middle point to an outer peripheral edge of the friction material substrate so that the friction material substrate decreases the thickness in accordance with the inclination of the frictional surface of the counterpart member, and wherein the constant thickness part is provided at a part other than the thickness decreasing part, the constant thickness part has a constant thickness in the radial direction of the friction material substrate, and the constant thickness part is formed at an inner peripheral side in the radial direction of the friction material substrate, while the thickness decreasing part is formed at an outer peripheral side in the radial direction of the friction material substrate.

3. A wet-type friction material according to claim 1, in which the friction material substrate has a laser carbonized superficial part from a surface to a depth within a range between 1 μm to 15 μm, the laser carbonized superficial part being carbonized by heating by a laser beam irradiated on a resin and fibers existing in a superficial part of the friction material substrate.

4. A wet-type friction material according to claim 2, in which the friction material substrate has a laser carbonized superficial part from a surface to a depth within a range between 1 μm to 15 μm, the laser carbonized superficial part being carbonized by heating by a laser beam irradiated on a resin and fibers existing in a superficial part of the friction material substrate.

5. A wet-type friction material according to claim 1, in which the thickness decreasing part has a width within a range of 28% to 50% of a length in the radial direction of the friction material substrate.

6. A wet-type friction material according to claim 2, in which the thickness decreasing part has a width within a range of 28% to 50% of a length in the radial direction of the friction material substrate.

7. A wet-type friction material according to claim 5, in which a maximum decrease of the thickness at the outer peripheral edge of the friction material substrate is set to not more than 5/100 of a largest thickness of the friction material substrate.

8. A wet-type friction material according to claim 6, in which a maximum decrease of the thickness at the outer peripheral edge of the friction material substrate is set to not more than 5/100 of a largest thickness of the friction material substrate.

* * * * *